United States Patent [19]

Yalpani et al.

[11] Patent Number: 4,857,638
[45] Date of Patent: Aug. 15, 1989

[54] LIGNIN HAVING NITROGEN AND SULFUR AND PROCESS THEREFOR EMPLOYING THIOUREA

[75] Inventors: Manssur Yalpani, Kirkland; Leon Magdzinski, Montreal, both of Canada

[73] Assignee: Domtar Inc., Montréal, Canada

[21] Appl. No.: 138,100

[22] Filed: Dec. 28, 1987

[51] Int. Cl.[4] .................... C08F 45/48; C08F 3/30
[52] U.S. Cl. ............................. 530/505; 530/501; 530/502; 530/504
[58] Field of Search ........................... 530/505

[56] References Cited

U.S. PATENT DOCUMENTS 3,915,911  10/1975  Horiguchi ........................ 530/505

OTHER PUBLICATIONS

Chem. Abstracts 55:21579e, Kogyo Kagaku Zasshi 61, 1078–1079, (1958).

Primary Examiner—John Kight
Assistant Examiner—Frederick Krass
Attorney, Agent, or Firm—Antoine H. Gauvin

[57] ABSTRACT

A product comprising lignin material having a N-content of at least 1.86% and a sulfur content of at least 3.1%, an IR in the vicinity of 1550 to 1670 cm$^{-1}$ having a peak width of at least 60 cm$^{-1}$. The product is also directed to such products being cross-linked and which are most suitable as chelating agents in basic medium. The product may also be used as flame retardant, for agricultural and other end uses. The invention is also directed at a method of making the above product which comprises heating a lignin containing material with thiourea $H_2N$—$C(S)$—$NH_2$: for example by heating in a solvent or melting.

26 Claims, 4 Drawing Sheets

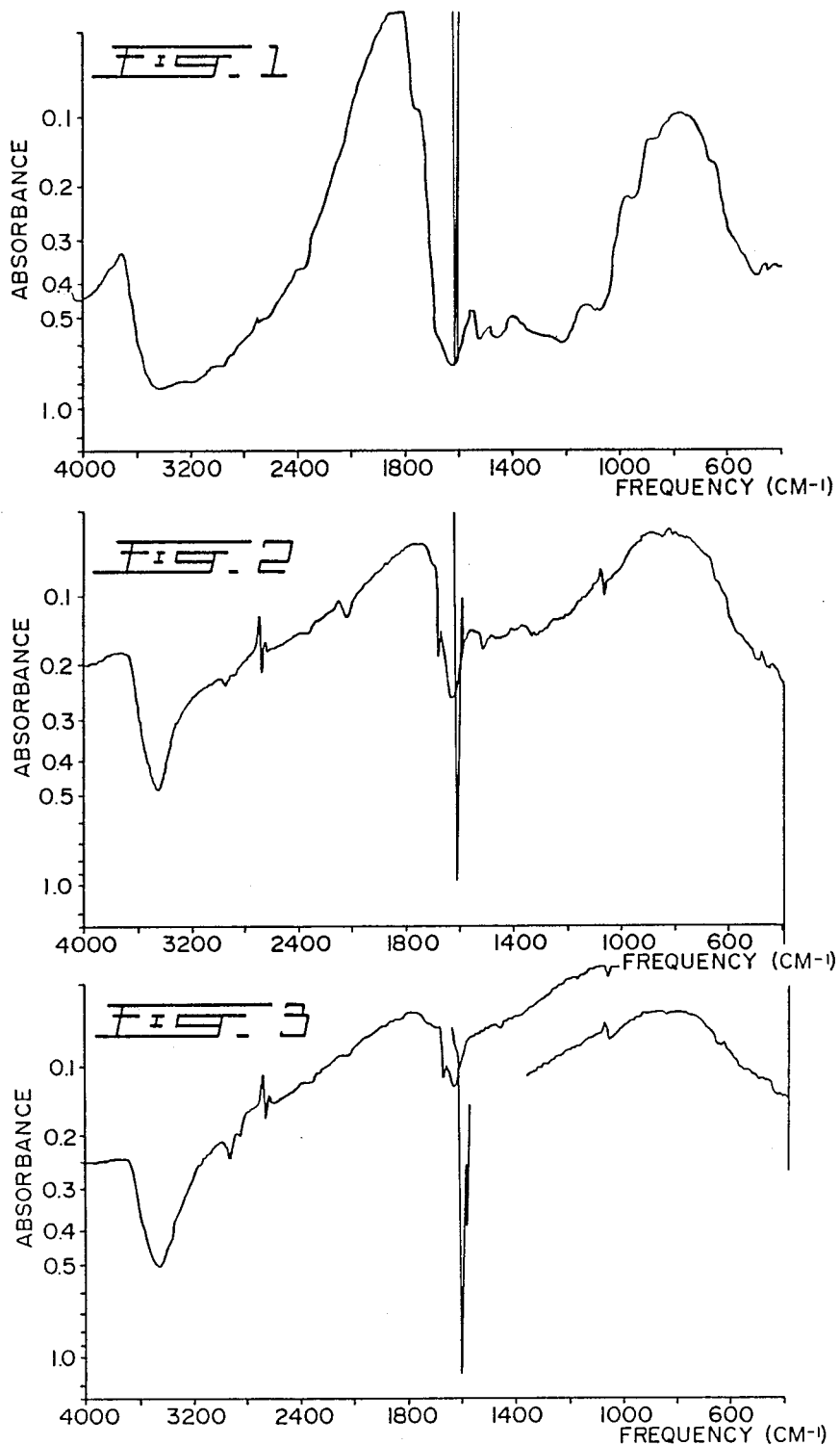

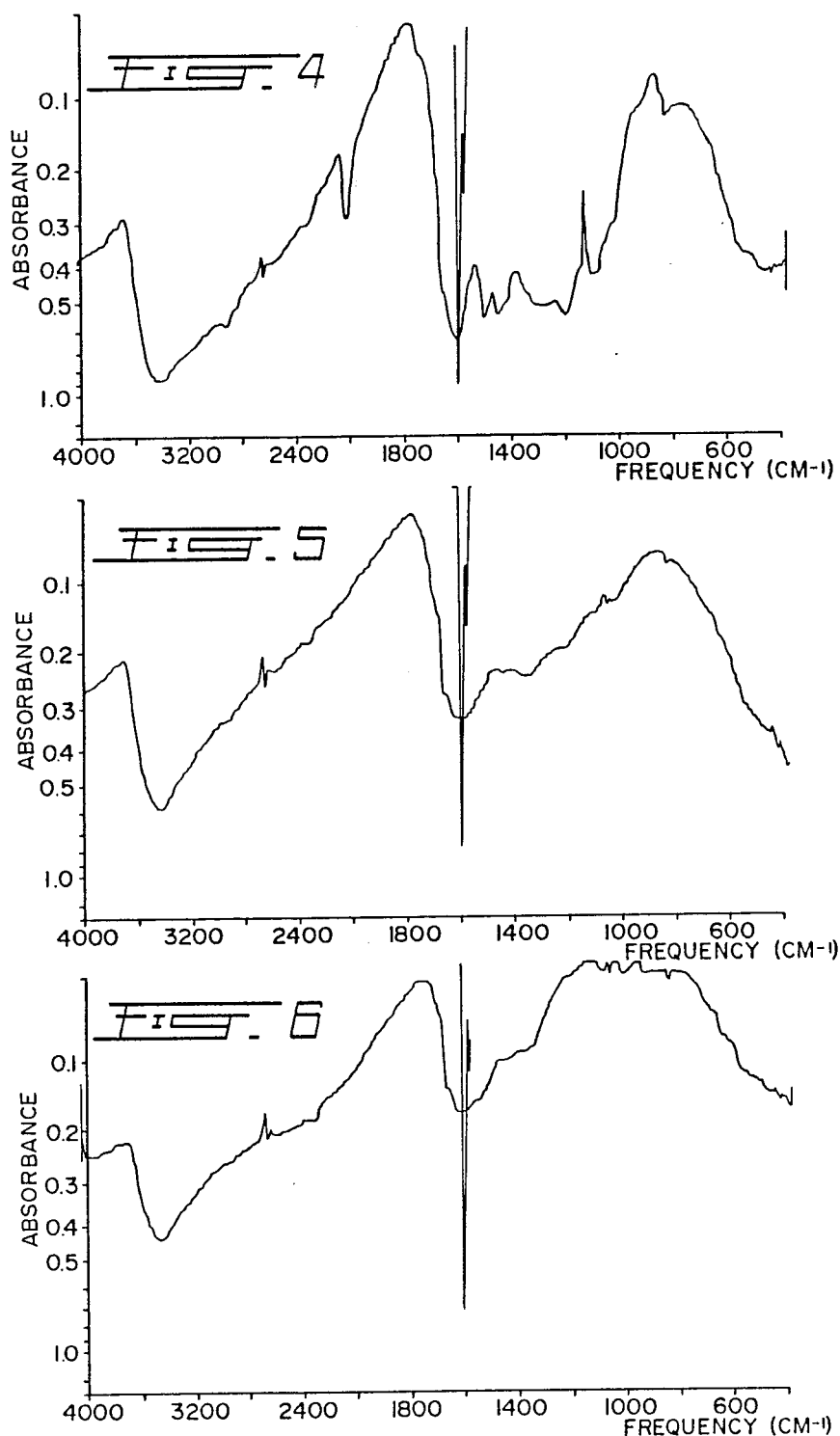

LIGNIN HAVING NITROGEN AND SULFUR AND PROCESS THEREFOR EMPLOYING THIOUREA

This invention relates to a product derived from lignin containing materials, and to a method making same. This invention is particularly directed at lignin materials comprising nitrogen and sulfur groups to be used for instance in chelation, and for agriculture uses having in weight percent, a N-content of at least 1.86% and a sulfur content of at least 3.1%.

PRIOR ART

Traditional ion exchange resins contain functionalities capable of exchanging their cations, as in the case of sulfonated or phosphorylated materials, or of exchanging their anions, as in quaternary aminated products. These materials are generally synthesized in granular or spherical bead form through the polymerization of ethylenically unsaturated monomers such as styrene or acrylic acid and a cross-linking agent such as divinylbenzene to render them insoluble in a particular solvent. The monomers may be modified to include desired functional groups prior to the polymerization of the preformed polymeric matrix and/or they may be subsequently chemically modified to achieve the desired acid or base form. The capacities of these materials are generally expressed in milliequivalents active protons per gram of cationic resin (meq/g) or in meq/g exchangeable chloride for the anionic resins, or sometimes referred to as: (mmol/g) as it will be used in this application.

Ion exchange resins have been used in the removal of metal ions from aqueous solutions as water softening, treatment of radioactive wastes, purification of industrial effluents containing heavy or toxic metals, in the commercial isolation of metal ions, in the purification and separation of rare earths and yttrium for the fabrication of semi- and super-conductors, in the recovery of chromium from spent metal plating solutions and zinc and copper from waste occuring in the synthetic fiber industry, and in the industrial isolation of precious metals such as gold and platinum in mining and their purification in electronics.

Their high cost and low selectivity have prevented their technological use in the large scale purification of metals, uranium and gold being the exceptions, even though these resins are preferred for the analytical isolation of many different metals. The need for more selectivity in the industry has led to the development of ion exchange resins which are capable of binding preferentially a certain metal ion in the presence of others of the same charge. The numerous iminodiacetic acid based resins all show preference for the first row transition metals, but they are not very selective for specific metal ions. Multiple stage elution/adsorption cycles are needed to achieve separation of several metal components.

Increasing precious metal prices make the leaching of low grade ores profitable only if such metals can then be selectively isolated from the pregnant solutions containing a variety of other components usually in much greater amounts. As yet, the mining industry prefers the use of coconut shell charcoal ion exchangers to that of any synthetic resin due to their selectivity for gold and silver. Coconut shell charcoal is expensive and must therefore be regenerated at an added cost. It is fragile (up to 8% is lost in every extraction cycle along with any bond gold) and has very low capacity compared with that of the synthetic resins. However, most resins do not discriminate enough between different metal ions and, those which do, are not easily freed of their gold.

THE INVENTION

Broadly stated, the invention is directed to a product comprising lignin material having by weight of said lignin material a N-content of at least 1.86% and a sulfur content of at least 3.1%, an IR absorption band in the vicinity of 1550 to 1670 $cm^{-1}$ having a peak width of at least 60 $cm^{-1}$.

The product is also directed to such products being cross-linked with well known cross-linking agents such as epichlorohydrin, di-halogenated compounds e.g. dibromoethane, dichloromethane and the like and preferably formaldehyde. The cross-linked products are most suitable as chelating agents in basic medium, as will be discussed hereinbelow.

The invention is also directed to a method of making the above product which comprises heating a lignin containing material with thiourea $H_2N-C(S)-NH_2$, and preferably melting.

By lignin containing materials is meant a product which is 100% lignin or which contains as substrate a lignin, or if desired, other additives and lignin, or chemically modified lignin such as those having other compatible functional groups, i.e. not susceptible to react with thiourea, for example, lignin sulfonate or other functional groups as lignin triazines, nor interfering with the aims of this invention: that is, partaking in the reaction to product the functional groups that are desired with nitrogen and sulfur groups and not to hinder the reaction to produce them. Typical examples are products derived from hard- or soft-wood and including wood fibers themselves. The lignin used has generally a molecular weight greater than 500.

DRAWINGS

In the drawings which illustrate particular embodiments of the invention.

FIGS. 1 to 5 represent IR spectra of the products obtained from the examples wherein the abscissa represents the frequency from 400 to 4000, 4 to $40 \times 10^2$ $cm^{-1}$ as expressed in the Figures.

FIG. 6 represents the IR spectra of product from Example 9.

THE PREFERRED WAYS OF CARRYING OUT THE INVENTION

Figure 7:
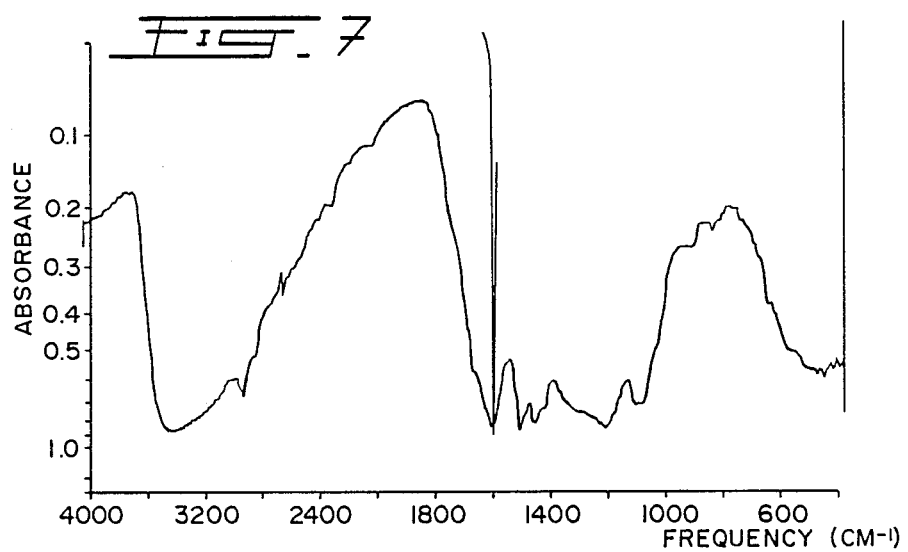
FIG. 7 represents the IR spectra of product from Example 10.

One of the preferred ways of carrying out the invention consists in reacting lignin with thiourea such as by melting or fusing the reaction mixture, hereinafter referred to as "melting" throughout the disclosure and claims.

The reaction time and temperature determines the amount of $H_2N-C(S)-NH_2$ addition but should be at least 2 hours at room temperature or above. Pressure may be used if desired, temperature ranging above 40° to 200° C., preferably above 70° C. and most preferably 160° C. If solvents are used, care should be taken to control the temperature preferably within 40°–125° C. and the solvent should be compatible as not to substantially affect or hinder the product, its nature, or the reaction in a deleterious or detrimental manner, nor interfere with the aims of this invention: Acidic medium may generally be used at low temperatures i.e. for instance at 70° C., while at higher temperatures basic or neutral medium should be used with a compatible solvent. Amongst preferred solvents are dimethylsulfoxide, dimethylformamide, dioxane and pyridine. Other solvents dissolving lignin and compatible with the reactants, may also be used, if desired: for instance, tetrahydrofuran. Aqueous media should be avoided, as they tend to hydrolyze the thiourea. Dialysis may be used, if desired to purify the resulting product as will be illustrated hereinbelow.

These products may be used in numerous manners. As examples in chelation, as flame retardants, in agriculture, in the making of composites, as will be demonstrated hereinafter. They may also be used for biotechnological applications.

EXAMPLES

The following will now serve to illustrate particular embodiments of the invention, all parts being expressed by weight.

EXAMPLE 1

One part of lignin derived from kraft hardwood was isolated by $CO_2$ precipitation and 2 parts of thiourea were melt-mixed at 190° C. for 1 hour(h) until evolution of gas occurred. The tar was left at 150°–170° C. for 16 h then cooled and broken up in 25 parts $H_2O$ containing 5 parts 85% $H_3PO_4$ for 6 h. The solid was collected by suction, washed with water and dried to yield 106% crude material.

The dried material was refluxed overnight with 3.5 parts of $POCl_3$. After 18 h the mixture was poured onto 75 parts water, the solid collected and dialyzed for 1 day against 100 parts $H_3PO_4$ through cellulose acetate MWCO 3500 then against water for 5 days to yield 102% product having 7.85% nitrogen, 2.82% phosphorous, and 5.66% sulfur and showing infra-red absorption at 1660, 1600, 1510, 1220, 950, 850 and 655 cm$^{-1}$, as shown in FIG. 1 and Table 1 on page 20.

The solubility of the product as expressed here and throughout the application is in g/l, was as follows: pH 13: 13.0; pH 1: 0.8; acetone: 0.1.

On chelation with solutions at pH containing 1000 ppm of each of the mixed metals the following was found, as compared against two conventional ion exchange resins, expressed in mmol/g:

|  | Au | Cu | Pt | Ca | Fe | Hg | Pb |
|---|---|---|---|---|---|---|---|
| Example 1 | 5.8 | 0.8 | 2.8 | 0.2 | 1.6 | 0.1 | 0.1 |
| "Amberlite IRA-400" | 2.5 | 0.6 | 1.7 | 0.1 | 0.0 | 0.4 | 0.1 |
| "Amborane 345" | 5.4 | 0.6 | 4.5 | 0.1 | 0.0 | 0.5 | 0.2 |

EXAMPLE 2

One part of a solution containing 28% dry lignin derived from kraft softwood as obtained by ultrafiltration through a polysulfone membrane of 500 MWCO, was stirred with 2 parts of thiourea and heated to 190° C. until gas evolution started. After 1 h, 2 parts of thiourea were added and the reaction was left at 170°–190° C. After an additional 18 h the mixture was cooled and treated with 10 parts 85% $H_3PO_4$ and 50 parts $H_2O$. On stirring overnight, the solid was collected by suction and dialyzed against 100 parts diluted $H_3PO_4$ for 3 days through cellulose acetate MWCO 3500. Dialysis was continued against 100 parts MeOH for 5 days to yield 123% of product having 14.84% nitrogen, 1.89% phosphorus, and 15.73% sulfur and infra-red absorptions at 2030, 1630, 1510, 1220, 845 and 645 cm$^{-1}$, as shown in FIG. 2 and Table 1. On gel permeation chromatography the average molecular weight was found to be of the order of 1300.

The product had the following solubility: pH 13: 4.6, pH 1: 0.4, acetone: 0.1.

EXAMPLE 3

One part of wood fibre containing 64.8% solids was melted at 150°–200° C. with four parts of thiourea to give a black liquor after 30 minutes. One part of wood fibre was then added and the mixture became difficult to stir manually. After an additional 2 h of heating, the solid was poured onto 300 parts dilute phosphoric acid and collected by suction. The black solid was dialyzed for 5 days against 1:1 MeOH—$H_2O$ containing 1% phosphoric acid through cellulose acetate MWCO 6000, yielding 129% of a material with 14.76% sulfur and 25% nitrogen and showing an infra-red absorption at 2050, 1635, 1460, 1230, 840 and 645 cm$^{-1}$, as shown in FIG. 3 and Table 1.

EXAMPLE 4

One part of a lignin as used in Example 1, and 1 part of thiourea were heated to a melt showing some gas evolution at 190° C. with manual stirring of the thick melt. After 1.5 h the temperature was decreased to 160°–170° C. After an additional 17 h the reaction was cooled at 20° C., 15 parts water containing 4 parts 85% $H_3PO_4$ were added and the mixture stirred with a magnetic stirrer. After 7 h the black solid was collected by suction, washed with 15 parts water and air dried. The solid was dialyzed against 100 parts dilute $H_3PO_4$ for 1 day then water for 2 days through cellulose acetate 3500 MWCO to yield 128% of a product having 58.14% carbon, 4.48% hydrogen, 7.38% nitrogen, 5.43% sulfur and 0.84% phosphorus, and infra-red absorptions at 2040, 1610, 1505, 1200, 840 and 645 cm$^{-1}$, as shown in FIG. 4 and Table 1.

EXAMPLE 5

One part of dried product as obtained in Example 4 was dissolved in 10 parts 5% NaOH at 30°–40° C. and a solution of 37% formaldehyde (10 parts) was added. The reaction was heated at 90°–100° C. for 2 h at which time it had become acidic (pH=7). To maintain the reaction basic, 2 parts solid sodium hydroxide were added over a total of 8 h. The reaction was poured onto 100 parts water, the solid collected by suction, washed with water and dried in a vacuum desiccator to give 110% of a new cross-linked product having 53.24% carbon, 4.16% hydrogen, 8.65% nitrogen, 3.10% sulfur, 0.00% phosphorus and an infra-red sprectrum with with absorptions at 1610, 1515, 1210, 840 and 650 cm$^{-1}$, as shown in FIG. 5 and Table 1.

EXAMPLE 6

One part of lignin as obtained from Example 1 and 2 parts of thiourea were heated to a melt until gas was evolved at 190°-200° C. for 1.5 h with intermittant stirring then left at 160°-170° C. After 17 h, the reaction was cooled to 20° C. and 20 parts water were added. After stirring for 7 h, the solid was collected by suction, washed with water and air dried. It was dialyzed against 100 parts H$_2$O for 3 days through cellulose acetate 3500 MWCO to give 112% yield of a product having 57.10% carbon, 3.96% hydrogen, 13.79% nitrogen, 6.35% sulfur, 0.00% phosphorus and infra-red absorptions at 2050, 1625, 1520, 1220, 850 and 650 cm$^{-1}$, as shown in Table 1. The IR curve being substantially as in FIGS. 1, 4, 5.

EXAMPLE 7

The lignin thiourea product of Example 6 was reacted with formaldehyde under basic conditions as described in Example 5 to yield 118% of a new cross-linked product with elemental composition 51.79% carbon, 4.07% hydrogen, 12.45% nitrogen, 4.12% sulfur and 0.00% phosphorus with infra-red absorptions at 1550, 1670, 1510, 1220, 840 and 660 cm$^{-1}$, as shown in Table 1. The IR curve being substantially as in FIGS. 1, 4, 5.

EXAMPLE 8

Twenty parts of lignin as defined in Example 1 and 40 parts of thiourea were reacted at 160°-170° C. as per Example 6. After 17 h the reaction was cooled and 300 parts of water and 75 parts of 85% H$_3$PO$_4$ were added. After stirring for 7 h at 20° C., the solid was collected by suction, washed with water, and air dried. The solid was dialyzed against 2000 parts dilute H$_3$PO$_4$ for 1 day and against water for two days through cellulose acetate (3500 MWCO), to give 108% yield of a product having an elemental composition of 56.69% carbon, 4.01% hydrogen, 12.43% nitrogen, 7.42% sulfur, and 0.41% phosphorus and infra-red absorptions at 2050, 1620, 1510, 1220, 840 and 650 cm$^{-1}$.

EXAMPLE 9

The lignin product from Example 8 was reacted with formaldehyde under basic conditions as described in Example 5 to yield 110% of a new product having elemental composition of 53.77% carbon, 4.26% hydrogen, 11.65% nitrogen, 4.56% sulfur, 0.09% phosphorus and infra-red absorptions at 1550, 1670, 1510, 1220, 840 and 650 cm$^{-1}$, as shown in FIG. 6 and Table 1. Formaldehyde cross-linking decreases the sulfur content and the corresponding S-H (2030-2060 cm$^{-1}$) and CH-S (825-850 cm$^{-1}$) infra-red absorptions, as can be seen in Examples 5, 7 and 9, when compared with those of the non-cross-linked products in Examples 4, 6 and 8. The starting unmodified lignins contained the following sulfur contents: Example 1, 1.59% sulfur, Example 2, 1.68% sulfur and displayed weak infra-red absorptions at 2040 and 810-850 cm$^{-1}$.

Thermal analysis of the product revealed the following:

|  | UNDER NITROGEN | UNDER AIR | T °C. |
|---|---|---|---|
| WL* | 10% | 12% | 250 |
| WL | 35% | 32% | 500 |
|  | — | a weak exotherm | 535 |
| WL | 50% | 48% | 700 |
| ash content | 50% | 52% |  |
|  | weak endotherm | spontaneous | 720 |

|  | UNDER NITROGEN | UNDER AIR | T °C. |
|---|---|---|---|
|  |  | combustion |  |

*WL designates weight loss.

These results should be compared against untreated lignin results shown at the end of Example 10.

EXAMPLE 10

Two parts of lignin derived from kraft hardwood isolated by CO$_2$ precipitation and 4 parts of thiourea were melt-mixed for 1 hour (h) at 190° C. until rapid gas evolution occured. On cooling, 1.5 parts of P$_2$O$_5$ and 10 parts of 85% H$_3$PO$_4$ were added and the temperature was brought to 150° C. with good stirring to contain the foam. After 1 h the foam was poured onto 150 parts H$_2$O and the mixture stirred at 22° C. for 16 h.

The solid was collected by suction and dialyzed against 200 parts dilute H$_3$PO$_4$ for 1 day through cellulose acetate MWCO 3500, then for 4 days against water to yield 1.9 parts or 96% of a product having 4.53% nitrogen, 3.15% phosphorus, and 7.41% sulfur and infra-red absorptions at 2040, 1610, 1505, 1210, 930, 840 and 650 cm$^{-1}$, as shown in FIG. 7, Table 1.

A thermal analysis of the product revealed the following:

EXAMPLE 10

|  | UNDER NITROGEN | UNDER OXYGEN | T °C. |
|---|---|---|---|
| WL | 2.7% | 2.7% | 250 |
|  |  | exotherm | 290 |
|  |  | exotherm | 480 |
| WL | 27.3% | 75.3% | 500 |
|  |  | weak exotherm | 580 |
| WL | 37% | 86.0% | 700 |
| ash | 63% | 14% |  |
| Untreated lignin** |  |  |  |
| WL | 20% | 20% | 300 |
|  |  | exotherm | 320 |
|  |  | spontaneous combustion | 400 |
| WL | 40% | 92% | 450 |
|  | weak exotherm |  | 520 |
| WL | 84% | 92% | 700 |
| ash | 16% | 8% |  |

In the presence of oxygen, the product obtained from Example 10 at 700° C. was found to yield 14% ash in comparison to 8% with the lignin derived from kraft hardwood as defined in Example 1, line 1, which we will call "untreated lignin**" for sake of brevity, i.e. the lignin originally used to start the experiment in Example 10 untreated with thiourea. Furthermore, the product obtained from Example 10 has two exotherms in the 300° C. and 450° C. range, in comparison with spontaneous combustion at 400° C. range for untreated lignin. In nitrogen, resistance to heat is also shown comparing the product of Example 10 whose ash content is 63% against 8% for untreated lignin.

This is indicative of the ability of the product for use as flame retardant and/or thermoplastic additive.

EXAMPLE 11

One part of lignin and 2 parts of thiourea were reacted at 160°-170° C. as per Example 6. After 17 h, the reaction was cooled and 15 parts water and 4 parts 85% H$_3$PO$_4$ were added. After stirring for 7 h at 20° C., the solid was collected by suction, washed with water and air dried. The solid was dialyzed for 3 days against 100 parts H$_2$O through cellulose acetate 3500 MWCO to give 117% of product having 54.39% carbon, 4.08% hydrogen, 12.32% nitrogen, 7.07% sulfur, 1.70% phosphorus and infra-red absorptions at 2060, 1625, 1520, 1220, 840 and 650 cm$^{-1}$ and having a curve pattern somewhat as in FIGS. 1, 4, 5 and 7.

On chelation with solutions containing metals the following was found, as compared against conventional resins, expressed in K$_M^{Au}$.

EXAMPLE 11

| GOLD SELECTIVITY IN AN EIGHT METAL MATRIX GOLD SELECTIVITY COEFFICIENT, K$_M^{Au*}$ (pH 2) AS COMPARED TO PRIOR ART | | | | | | | |
|---|---|---|---|---|---|---|---|
| Metal | Au | Cu | Ni | Ca | Fe | Co | Zn | Pb |
| ppm conc. | 40 | 20 | 5 | 200 | 5 | 5 | 5 | 5 |
| Example 11 | — | 187 | 23 | 780 | 19 | >900 | >900 | >900 |
| Amberlite IRA-400 | — | 20 | — | — | 80 | — | 40 | 60 |
| Amborane 345 | — | 2 | — | — | 6 | — | 5 | 6 |
| Dowex XAS-4195 | — | 5 | — | — | 11 | — | 9 | 55 |
| Hardwood kraft lignin | — | 6 | — | — | 5 | — | 6 | 7 |

| GOLD SELECTIVITY COEFFICIENTS pH 9 AS CYANIDES | | | | | | | |
|---|---|---|---|---|---|---|---|
| Metal | Cu | Ni | Fe | Co | Zn | Pb | Ag |
| Example 11 K$_M^{Au*}$ | 7.3 | 2.0 | 0.6 | 2.0 | — | 0.8 | 0.6 |
| Amborane 345 K$_M^{Au}$ | 4.9 | — | 0.7 | — | — | 0.0 | 0.4 |
| Amberlite IRA-400 K$_M^{Au}$ | 3.6 | — | 0.8 | — | 2.9 | 0.0 | 0.5 |
| Dowex XSF-4195 K$_M^{Au}$ | 0.7 | — | 0.8 | — | — | 0.3 | 0.2 |

*K$_M^{Au}$ = (weight percent gold absorbed/concentration of gold in solution) × (concentration of metal in solution/weight percent metal absorbed)

In addition to the gold containing matrix solution a column containing 300 parts of the product of Example 11 was charged with a dilute hydrochloric acid solution containing 100 ppm of gold (III) chloride and 120 ppm of copper (II) sulfate at pH 2. The breakthrough point for copper occured immediately at 0–50 mL (120 ppm) indicating no copper binding whatsoever. The gold breakthrough occurred at 1.5 liters showing 0–5 ppm gold and rose slowly to 10 ppm at 2.75 liters when the feed solution gave out. The weight of the dried recovered column material had increased to 452 mg with 46.5% bound gold which was recovered by pyrolysis.

EXAMPLE 12

One part of the lignin as defined in Example 1, and 5 parts thiourea were dissolved in 15 parts DMF and heated at 140° C. After 6 h, the solution was poured onto water, acidified to pH 2 with 0.1N hydrochloric acid and the solid collected by filtration. The solid was dialyzed for 3 days against water through cellulose acetate to yield 83% of product with 1.93% nitrogen, 6.48% sulfur and infra-red absorptions at 2040, 1600, 1500, 1210, 825 and 640 cm$^{-1}$.

EXAMPLE 13

Figure 8:
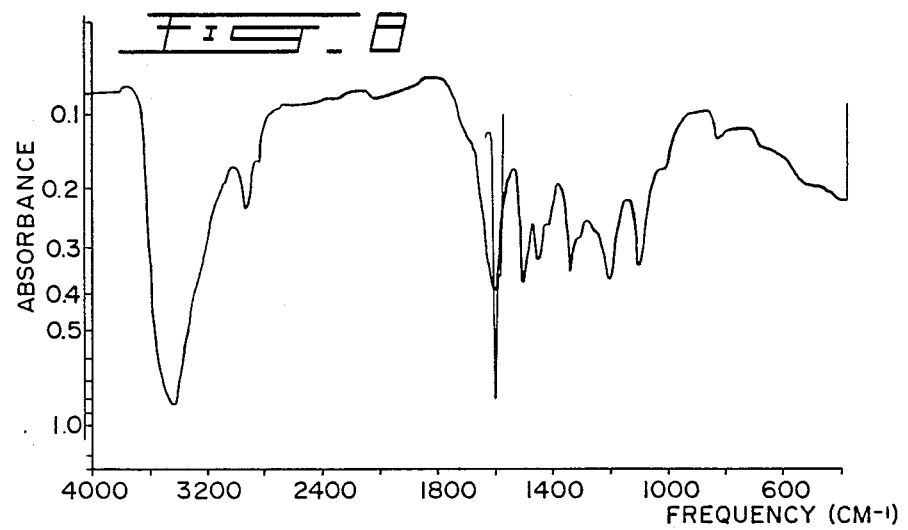
FIG. 8 represents the IR spectra of product from Example 13.

One part each of lignin as used in Example 1, thiourea and nitrobenzene were heated in 5 parts dioxane at 120° C./40 psi in a stainless steel autoclave. After 17 h, the mixture was poured onto water and the solid collected by filtration. The solid was dialyzed for 5 days against 1:1 methanol-water through cellulose acetate 3500 MWCO to yield 1.13 parts of product for a yield of 113% with 63.14% carbon, 5.14% hydrogen, 3.29% nitrogen, 3.33% sulfur and infra-red absorptions at 2050, 1610, 1510, 1210, 840 and 695 cm$^{-1}$, as shown in FIG. 8 and Table 1.

EXAMPLE 14

Figure 9:
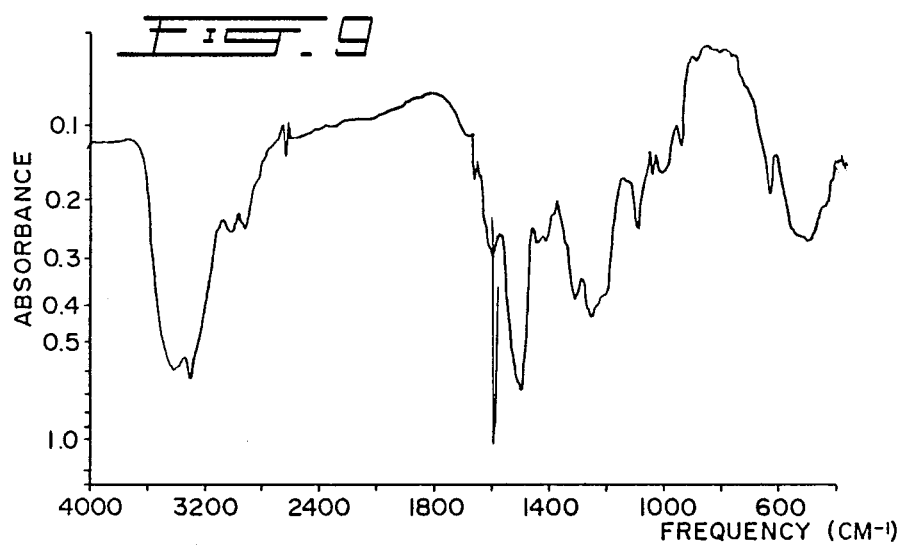
FIG. 9 represents the IR spectra of product form Example 14.

2.1 parts of a 37% aqueous formaldehyde solution was added to one part of a suspension of lignin as defined in Example 1, and 1 part of thiourea in 15 parts water containing 0.2 parts concentrated hydrochloric acid. The mixture was heated at 80° for 4 h. The material was isolated as per Example 12 to give a yield of 180% of a product with 14.50% nitrogen and 18.30% sulfur and infra-red absorptions at 1610, 1550, 1320, 1260, 1210, 840 and cm$^{-1}$, as shown in FIG. 9 and Table 1.

SAMPLE A

Figure 10:
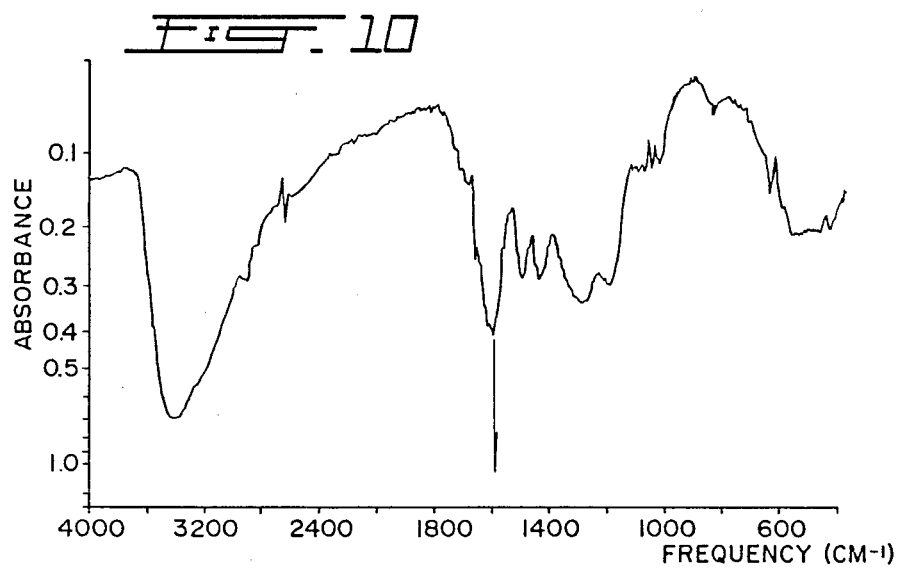
FIG. 10 represents the IR spectra of product from Example 15.

A mixture of 1 part of lignin as defined in Example 1, 1 part of thiourea and 5 parts of concentrated hydrobromic acid was refluxed at 125° C. for 8 h. 15 parts 10% sodium hydroxide were carefully added and the mixture allowed to cool to ambient temperature. After 16 h the mixture was acidified and the product isolated as per Example 12 to yield 84% of product with 4.29% sulfur, 2.58% nitrogen and infra-red absorptions at 2050, 1620, 1510, 1210, 850 and 650 cm$^{-1}$, as shown in FIG. 10 and Table 1.

Thermal analysis of the product reveals the following:

SAMPLE A

| | NITROGEN | AIR | T °C. |
|---|---|---|---|
| WL | 9% | 20% | 250 |
| | — | strong exotherm | 420 |
| WL | 35% | 80% | 500 |
| WL | 41% | 85% | 700 |
| ash | 59% | 15% | |

These results should be compared against untreated lignin, as shown in Example 10.

EXAMPLE 15

One part of a lignin as defined in Example 1 and 2 parts of thiourea were dissolved in 10 parts of dioxane containing 0.2 parts sodium hydroxide and heated at 140° C./40 psi. After 6 h the reaction was cooled and depressurized. The product was isolated and purified as described in Example 12 to yield 125% of product with 1.86% nitrogen, 3.11% sulfur and infra-red absorptions at 2050, 1610–1630, 1505, 1210, 840 and 650 cm$^{-1}$.

SAMPLE B

One part of a lignin as defined in Example 1 and 2 parts of thiourea were dissolved in 50 parts of dioxane containing 0.2 part trichloroacetic acid at 20° C. After 16 h the reaction was worked-up and the product isolated and purified as described for Example 12 to yield 88% of product with 1.10% nitrogen, 2.97% sulfur and infra-red absorptions at 1600, 1500, 1205, 835 and 640 cm$^{-1}$.

As can be seen from Table 1, the products have absorption bands at 1550–1670, as well as 1460–1520, 1200–1230, 825–850 and 635–695, and 2030–2060 cm$^{-1}$ when a product is not cross-linked. Cross-linked polymers as obtained from the Examples have a peak width in the vicinity of 1550–1670 cm$^{-1}$ of at least 80 cm$^{-1}$.

The molar ratio N:S:Ar stands for the mole ratios of nitrogen to sulfur to aromatic unit of the lignin, wherein said Ar in said mole ratio is arbitrary set to define an aryl propane unit having an average molecular weight of 242. The ratio N:S is the number obtained from N:S:Ar where N/S. From these examples, one generally obtains N:S:Ar:: 0.03–4.5:0.05–1.4:1. Preferably said N/S ratio is at least 2.13 and most preferably 2.8.

Chelation characteristics of all examples are shown in Table 2. As seen from Table 2, when the products from the examples were successfully used to chelate numerous metals as listed in said table and including rare earths, precious and other metals either by simple batch contact or through elution in columns.

The product may also be further reacted if desired, such as by incorporating phosphorus groups by reacting the product with a phosphorylating agent as shown in examples, for instance Examples 10, 1, 2. Typical phosphorylating agents include members selected from the group consisting of phosphoric acid, phosphorus oxychloride (POCl$_3$), tripolyphosphate and phosphorus pentoxide.

Having described the invention, modifications will be evident to those skilled in the art without departing from the spirit of the invention, as defined in the appended claims.

TABLE 1

| EXAMPLE NO. | MOLAR RATIO N:S:Ar | N/S | 2030–2060 (S—H) | 1550–1670 (Ar,N—H) | peak width of band (cm$^{-1}$) | 1460–1520 (Ar,C=N) | 1200–1230 (Ar—O) | 825–850 (Ar,CH—S) | 635–695 (Ar—S) |
|---|---|---|---|---|---|---|---|---|---|
| 1 | 1.4:0.5:1 | *2.8 | 2 | 36 | 90 | 10 | 10 | 4 | 4 |
| 2 | 2.7:1.2:1 | 2.3 | 14 | 62 | 62 | 14 | 10 | 6 | 8 |
| 3 | 4.5:1.2:1 | 3.8 | 10 | 110 |  | 15 | 10 | 10 | 15 |
| 4 | 1.3:0.4:1 | 3.3 | 26 | 40 | 82 | 17 | 10 | 10 | 3 |
| 5 | 1.4:0.3:1 | 4.7 | 0 | 56 | 131 | 14 | 10 | 6 | 4 |
| 6 | 2.4:0.5:1 | 4.8 | 24 | 40 | 74 | 12 | 10 | 8 | 6 |
| 7 | 2.3:0.3:1 | 7.7 | 0 | 87 | 164 | 10 | 10 | 5 | 8 |
| 8 | 2.2:0.6:1 | 3.7 | 50 | 70 | 82 | 10 | 10 | 12 | 10 |
| 9 | 2.1:0.4:1 | 5.3 | 0 | 46 | 131 | 10 | 10 | 6 | 8 |
| 10 | 0.8:0.6:1 | 1.33 | 2 | 24 | 98 | 12 | 10 | 3 | 3 |
| 11 | 2.2:0.6:1 | 3.7 | 42 | 60 | 82 | 12 | 10 | 15 | 8 |
| 12 | 0.3:0.5:1 | 0.6 | 4 | 24 | 62 | 18 | 10 | 4 | 1 |
| 13 | 0.6:0.3:1 | 2.0 | 1 | 16 | 74 | 12 | 10 | 3 | 1 |
| 14 | 2.6:1.4:1 | 1.9 | 0 | 15 |  | 60 | 10 | 3 | 15 |
| Sample A | 0.4:0.3:1 | 1.3 | 1 | 18 | 69 | 6 | 10 | 3 | 3 |
| 15 | 0.3:0.2:1 | 1.5 | 2 | 18 |  | 18 | 10 | 3 | 1 |
| Sample B | 0.2:0.2:1 | 1.0 | 0 | 17 |  | 14 | 10 | 2 | 1 |

*obtained by dividing from molar ratio N:S:Ar, Ar being 1, i.e. 1.4/0.5 = 2.8

TABLE 2

CHELATION RESULTS (mmol/g)

| EXAMPLE | Au pH 2 | Au 3 | Au 7 | Au 8 | Au 11 | Ag 2, | Ag 3 | Pt 2 | Pd | Cu 3, | Cu 6 | Cd 6 | Ca 3 | Mg 3 | Hg 2 | Ni 3 | Er 2 | La 2 | Y 2 |
|---|---|---|---|---|---|---|---|---|---|---|---|---|---|---|---|---|---|---|---|
| 1 | 5.8, | 6.4, | 7.7 |  |  | 0.9, | 2.2 | 1.3, | 3.4 | 0.2 |  |  | 0.2 |  | 0.5 | 0.6 | 0.4, | 0.2, | 0.1 |
| 2 | 5.7 |  | 4.9 |  |  |  |  |  |  |  |  |  |  |  |  |  |  |  |  |
| 3 | 5.7 |  | 6.4 |  |  |  | 1.7 |  |  |  |  |  |  | 1.1 |  |  |  |  |  |
| 4 | 9.6 |  | 7.9 |  |  |  |  |  |  |  |  |  |  |  |  |  |  |  |  |
| 5 | 4.9 |  |  |  |  |  |  |  |  |  |  |  |  |  |  |  |  |  |  |
| 6 | 9.4 |  | 5.5 |  |  |  |  |  |  |  |  |  |  |  |  |  |  |  |  |
| 7 | 4.7 |  |  |  |  |  |  |  |  |  |  |  |  |  |  |  |  |  |  |
| 8 | 8.2 |  | 8.8, | 1.0 |  |  |  |  |  |  |  |  |  |  |  |  |  |  |  |
| 9 | 4.3 |  | 3.0, | 1.3 |  |  |  |  |  |  |  |  | 0.2 | 0.7 |  |  |  |  |  |
| 10 | 1.1 |  |  |  |  | 0.5 |  |  |  | 0.1 |  |  | 0.2 |  | 0.1 | 0.5 |  |  |  |
| 11 | 8.5 |  | 8.1 |  |  |  |  |  |  |  |  |  |  |  |  |  |  |  |  |
| 14 |  |  |  |  |  |  |  |  |  |  |  | 0.4 | 0.1 |  |  |  |  |  |  |
| Sample A | 3.0 |  |  |  |  |  |  |  |  |  |  | 0.2 | 0.6 |  |  |  |  |  |  |

We claim:

1. A product comprising a substantially water insoluble lignin material having by weight of said lignin material a N-content of at least 4.5%, a sulfur content of at least 3.1%, IR bands in the vicinity of 1550 to 1670 cm$^{-1}$, 1460 to 1520 cm$^{-1}$ and 1200 to 1230 cm$^{-1}$, said IR band in the vicinity of 1550 to 1670 cm$^{-1}$ having a peak width of at least 60 cm$^{-1}$ and an intensity from 3.6 to 11 relative to the band at 1200 to 1230 cm$^{-1}$, said IR band in the vicinity of 1550 to 1670 cm$^{-1}$ having an intensity from 2 to 11 relative to the intensity of the band at 1460 to 1520 cm$^{-1}$, said lignin material being substantially free from thiourea and isothiuronium salts, having chelating capacities for gold at pH 2 in excess of three millimoles of gold per gram of said lignin and being able to absorb metals.

2. A product as defined in claim 1 which has an IR absorption band in the vicinity of 2030–2060 cm$^{-1}$, and further IR absorptions in the vicinity of 825–850 and 635–695 cm$^{-1}$.

3. A product as defined in claim 1 which has a molar ratio N:S of at least 2:3, calculated from the ratio N:S:Ar, Ar being 1 and representing an average aryl propane unit having an average molecular weight of 242.

4. A product as defined in claim 1 wherein the % weight of nitrogen is between 7 and 25% and the % weight of sulfur is between 3.1 and 16 based upon the weight of the lignin material.

5. A product as defined in claim 1 which further includes phosphorus between 0.09 to 3.15%.

6. A product as defined in claim 1 wherein the molar ratio N:S:Ar is 1.3–3:0.5–1.0:1.

7. A method for making the lignin material having N and S content as defined in claim 1, comprising: heating a lignin containing material with thiourea in a basic or neutral medium, such heating being conducted at a temperature between 40° and 200° C., but below the temperature producing ammonia gas evolution, to produce an insoluble reaction product having N and S content as defined in claim 1, and after the heating producing said insoluble reaction product, carrying out purification of said insoluble reaction product to remove unreacted thiourea, said purification being conducted without affecting by heat the insoluble reaction product, thereby obtaining said water insoluble reaction product having IR bands as defined in claim 1.

8. A method as defined in claim 7 wherein the lignin and thiourea are melted until evolution of gas occurs, then said heating is reduced to a temperature lower than that producing gas evolution until said reaction product is obtained, thereafter cooling and collecting the solid for said purification.

9. A method as defined in claim 8 wherein the lignin and the thiourea are mix-melted at about 150° to 200° C. in a basic or neutral medium until evolution of gas occurs, then said heating is reduced to a temperature lower than that producing gas evolution until said reaction product is obtained.

10. A method as defined in claim 7 wherein lignin and thiourea are heated in the presence of a compatible solvent.

11. A method as defined in claim 10 wherein said heating is at a temperature above 100° C. conducted.

12. A method as defined in claim 10 wherein said heating is between 110° and 140° C. in an acidic medium.

13. A method as defined in claim 7 which further comprises incorporating phosphorus groups by reacting the product of claim 1 with a phosphorylating agent.

14. A method as defined in claim 13 wherein said phosphorylating agent is one member selected from the group consisting of phosphoric acid, phosphorus oxychloride ($POCl_3$) tripolyphosphate and phosphorus pentoxide.

15. A method as defined in claim 7, wherein the purification of said reaction product includes, carrying out dialysis of the reaction product in a slightly acidic aqueous medium.

16. A product as defined in claim 1 wherein the molar ratio of N:S is at least 2:8, calculated from the ratio N:S:Ar, Ar being 1, and representing an average aryl propane unit having an average molecular weight of 242.

17. The method as defined in claim 7 wherein said purification includes washing said reaction product with neutral or acidic water to remove the unreacted thiourea and thereafter collecting the insoluble reaction product having N and S content as defined in claim 1.

18. The process as defined in claim 7 wherein there is 1 to 4 parts of thiourea per part by weight of lignin.

19. The process according to claim 7 wherein the yield of the reaction product obtained from said process is over 100% by weight of the lignin in said lignin containing material.

20. The process according to claim 7 wherein the yield of the reaction product having said N and S content, is between 102 and 129% based upon the weight of lignin in said lignin containing material.

21. The process according to claim 7 wherein the weight ratio of said lignin in said lignin containing material to said thiourea is about 1:1.

22. The product as defined in claim 3 wherein said ratio N/S is between 3:3 and 4:8.

23. The product as defined in claim 1 having a chelating capacity for gold from 8 to 9.6 millimoles per gram of said lignin.

24. The product as defined in claim 1 wherein the molar ratio N:S:Ar is 1.3–3.5:0.4–0.6:1.

25. The method as defined in claim 8 wherein said temperature lower than that producing gas evolution is between 160°–170° C.

26. The method as defined in claim 7 wherein the lignin and thiourea are melted until evolution of gas occurs, then said heating is reduced to between 160° C. and 170° C. and maintained thereto until the reaction product having said N and S content is produced.

* * * * *

UNITED STATES PATENT AND TRADEMARK OFFICE
CERTIFICATE OF CORRECTION

PATENT NO. : 4,857,638
DATED : Aug. 15, 1989
INVENTOR(S) : Manssur Yalpani, Leon Magdzinsky It is certified that error appears in the above-identified patent and that said Letters Patent is hereby corrected as shown below:

In claim 11, the last word "conducted" should be displaced between "is" and "at".

In claim 18, first line, "The process" should read: -- The method --.

In claim 19, first line, "The process" should read: -- The method --.

In claim 20, first line, "The process" should read: -- The method --.

In claim 21, first line, "The process" should read: -- The method --.

Signed and Sealed this

Twenty-first Day of July, 1992

*Attest:*

DOUGLAS B. COMER

*Attesting Officer*   *Acting Commissioner of Patents and Trademarks*